Figure 1:
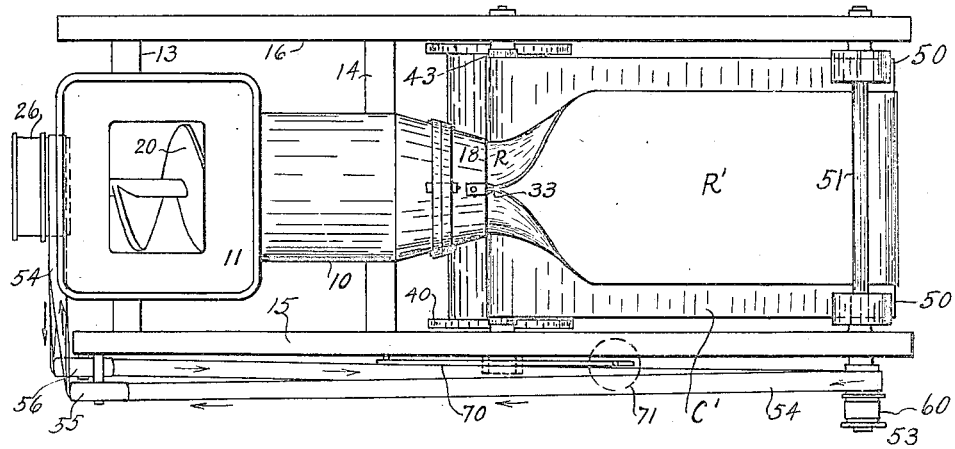

F. T. ROBERTS.
METHOD OF AND APPARATUS FOR MAKING SHEET RUBBER.
APPLICATION FILED DEC. 29, 1919.

1,435,659.

Patented Nov. 14, 1922.

3 SHEETS—SHEET 1.

INVENTOR
Fred Thomas Roberts,
BY Bates & Macklin,
ATTORNEYS

F. T. ROBERTS.
METHOD OF AND APPARATUS FOR MAKING SHEET RUBBER.
APPLICATION FILED DEC. 29, 1919.
1,435,659.
Patented Nov. 14, 1922.
3 SHEETS—SHEET 2.
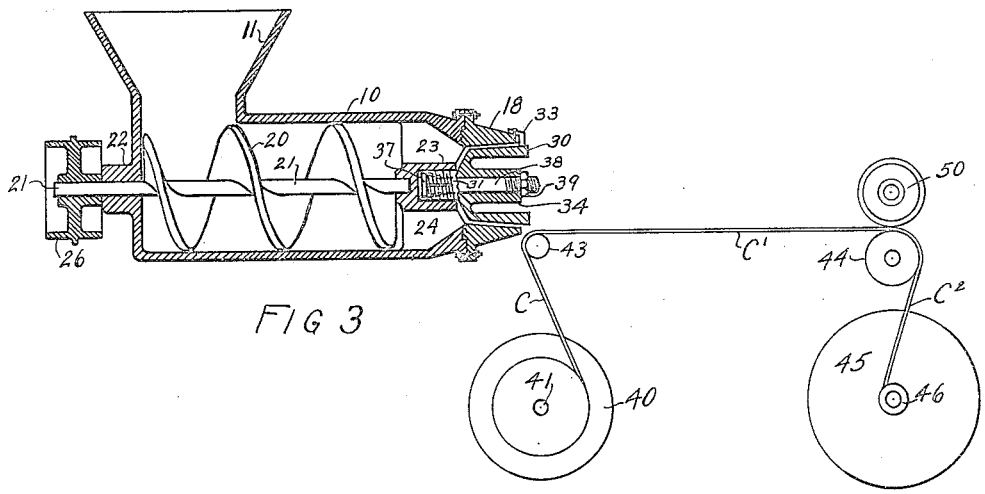
FIG 3
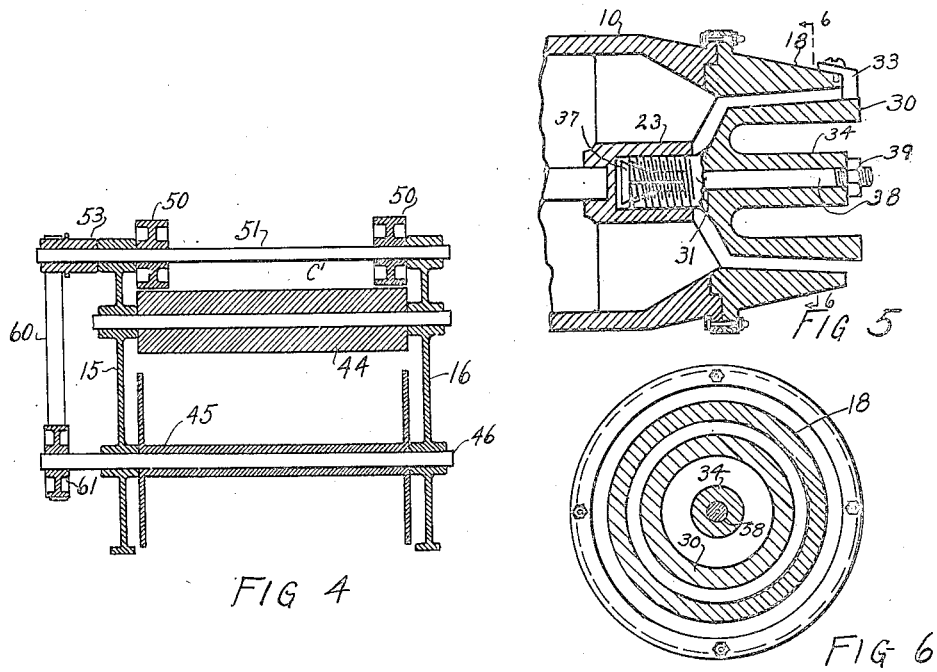
FIG 4
FIG 5
FIG 6
INVENTOR
Fred Thomas Roberts,
BY Bates & Macklin,
ATTORNEYS.

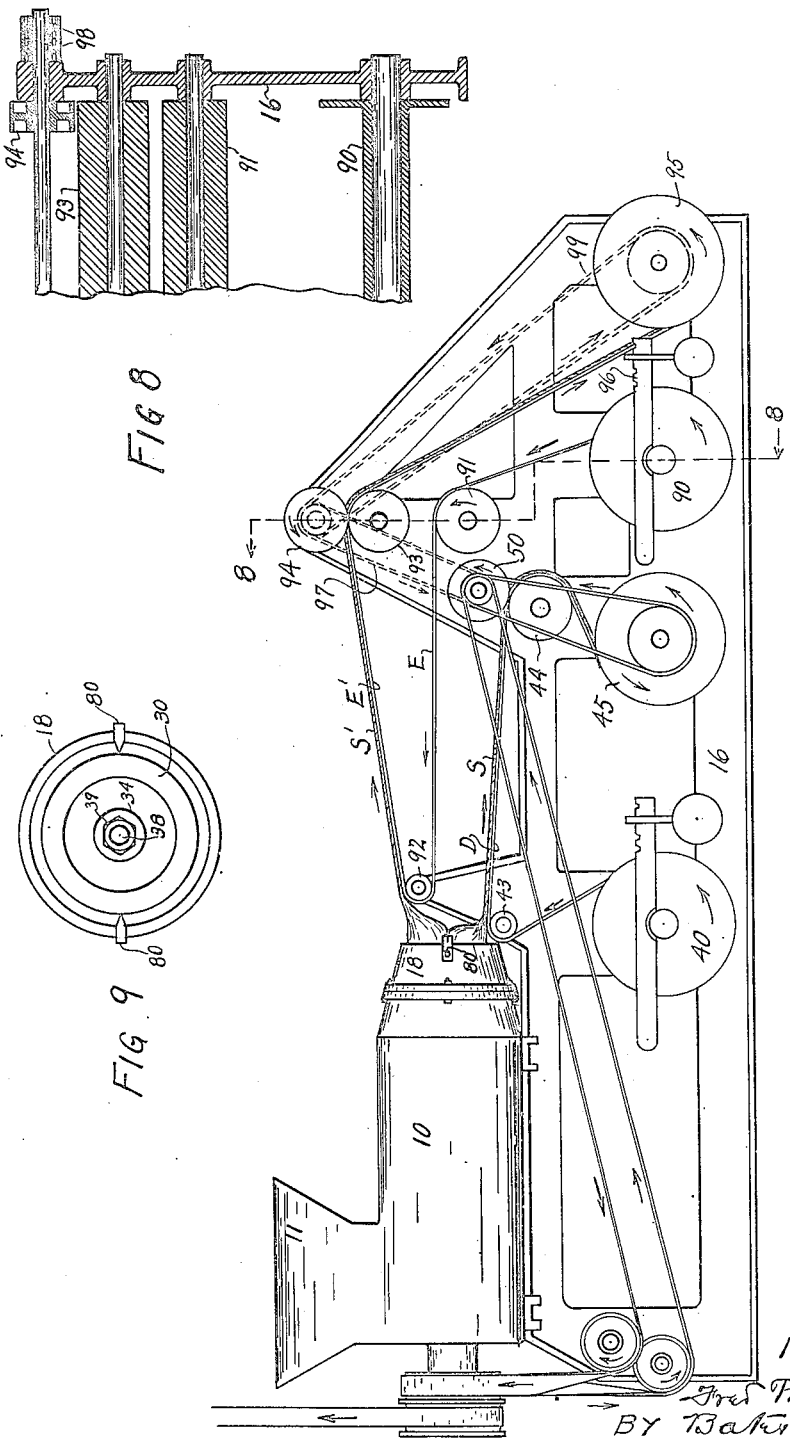

Patented Nov. 14, 1922.

1,435,659

UNITED STATES PATENT OFFICE.

FRED THOMAS ROBERTS, OF CLEVELAND, OHIO, ASSIGNOR TO PARAMOUNT RUBBER CONSOLIDATED, INC., OF PHILADELPHIA, PENNSYLVANIA, A CORPORATION OF DELAWARE.

METHOD OF AND APPARATUS FOR MAKING SHEET RUBBER.

Application filed December 29, 1919. Serial No. 348,097.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of and Apparatus for Making Sheet Rubber, of which the following is a full, clear, and exact description, reference being had to the accompanying drawings.

The object of this invention is to provide for the cheap and rapid manufacture of sheet rubber.

In performing such operation I place raw rubber stock in a tubing machine and force it out in the form of a continuous rubber tube, and as this tube emerges from the tubing machine I slit it longitudinally at one or more places to provide one or more flat sheets, the total width of which is equal to the circumference of the tube. Each flat sheet is caused to lie on a strip of canvas and is rolled up with the canvas, the canvas thus separating the layers of raw rubber.

The invention comprises such a process of making sheet rubber; also an apparatus which may be employed in carrying out the process and which is illustrated in the drawings hereof.

Figure 2:
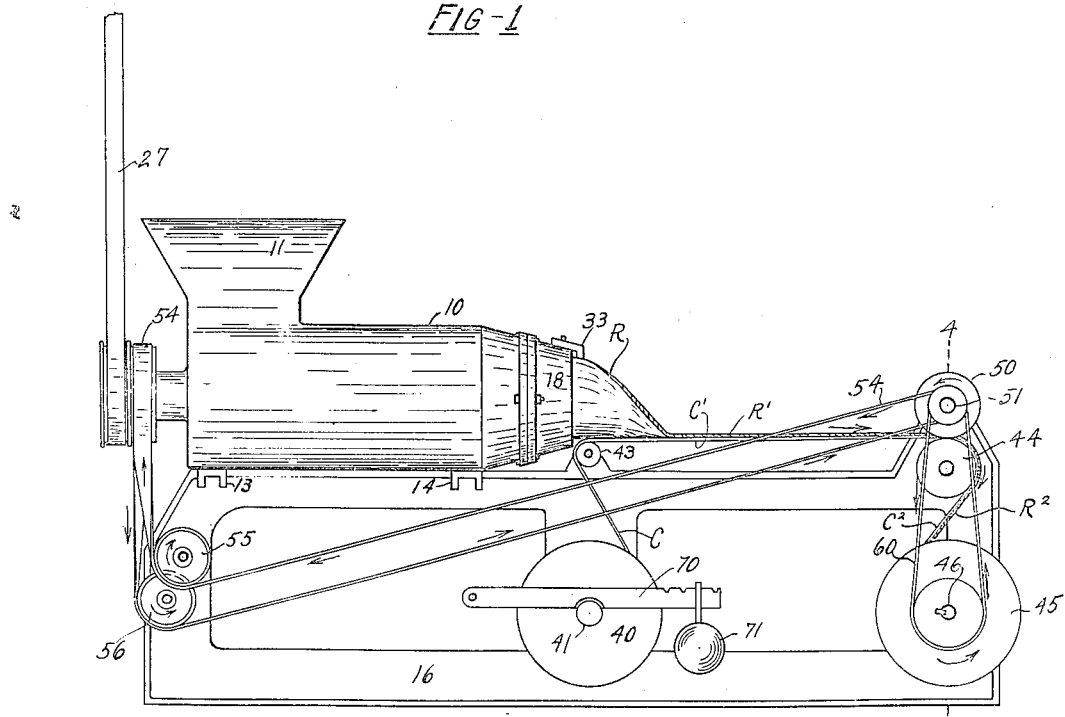

In the drawings Fig. 1 is a plan of my apparatus, adapted for making a single wide sheet of rubber and showing such sheet in process of being formed; Fig. 2 is a side elevation of such apparatus with the near frame member removed; Fig. 3 is a vertical longitudinal central section of the same, the frame being omitted, Fig. 4 is a vertical cross section as indicated by the line 4—4 on Fig. 2; Fig. 5 is an enlarged sectional view of the mandrel and adjacent parts of the tubing machine; Fig. 6 is a sectional end view of the tubing machine portion of the apparatus looking from the right hand end; Fig. 7 is a side elevation of the apparatus, adapted for making two sheets at a time; Fig. 8 is a cross section of the last mentioned embodiment, as indicated by the line 8—8 on Fig. 7; Fig. 9 is an end view of the tubing machine shown in Fig. 7.

I will first describe the embodiment shown in Figs. 1, 2 and 3, as there shown, 10 indicates the casing or body of the tubing machine or pug mill, having a suitable receiving hopper 11. The casing is supported in any suitable manner, as for instance, by cross members 13 and 14 secured to side frames 15 and 16. At its discharge end the casing is preferably contracted and there carries a removable tubular die 18.

Within the casing 10 is a suitable worm designated 20, in Figs. 1 and 3. This worm is rigid on a shaft 21, which is journaled in a bearing 22 at the left hand of the casing and a bearing 23 within the casing carried by suitable webs 24. On the shaft 21 is a pulley 26 adapted to receive a belt 27 by which the worm may be rotated.

Within the die 18 at the end of the casing 10 is located a mandrel 30. This mandrel is mounted by a stud 31, secured in the bearing sleeve 23 in alinement with the shaft 21. The exterior surface of the mandrel is a suitable distance within the surrounding interior surface of the die resulting in an annular passageway between the two surfaces through which the rubber will be discharged in the form of a tube. 33 indicates a suitable knife which in the embodiment of Figs. 1–6 is carried by the end of the highest portion of the die and depends across the annular passageway.

The effect of the knife positioned as described, is to slit this rubber tube along its topmost line as it is emitted from the casing. Such rubber tube is shown at R in Figs. 1 and 2. After it is slit by the knife its elevated portions drop so that it comes into the horizontal flat sheet shown at $R^1$ of these figures.

To receive the sheet of rubber and wind it on to a spool in utilizable form, I provide a long strip of canvas C. As shown in Figs. 1, 2 and 3, this canvas is initially wound on a spool 40, removably mounted on a shaft 41 journaled in the frame members 15 and 16. From this spool the canvas passes upwardly over a roll 43 just beneath the projecting end of the mandrel. From this roller the canvas passes horizontally as shown at $C^1$ and thence over a roll 44 to a winding spool 45. This latter spool is removably mounted on a shaft 46 but is splined to the shaft to be rotated thereby. The horizontal reach $C^1$ of the canvas strip receives and supports the flat strip $R^1$ of the raw rubber, as clearly shown in Fig. 1, and the canvas and rubber are wound up together on the spool 45, as indicated by the portions of canvas and rubber at C² and R² respectively.

To feed the canvas and rubber onto the receiving spool at a definite speed, irrespective of the increasing diameter of the roll on the spool, I provide a pair of gripping rolls 50 which engage marginal zones of the canvas beyond the edge of the rubber, the canvas being made wider for this purpose. These rolls 50 are rigid on a driving shaft 51 and coact with the end portions of roll 44. Suitable means is provided for rotating the shaft 51 at a definite speed, as for example, the pulley 53 thereon which receives a belt 54. This belt is shown as passing across idler sheaves 55 and 56, and thence around a portion of the pulley 26, though any other suitable driving connection may be employed if desired.

To wind up the spool 45 I provide a comparatively loose belt 60 which extends from a portion of the pulley 53 over a pulley 61 on the shaft 46. The grip of this belt is sufficient to keep the spool wound up, but the belt slips as the roll on the spool becomes larger in diameter, the grip of the belt being insufficient to draw the canvas and rubber along faster than the positive speed of the rolls 50 and 44. It is desirable to preserve a suitable tension on the canvas as it passes from the initial roll, and this may be readily effected by a brake acting on that spool or its shaft. As shown the spool 40 is adapted to be rotated only with its shaft 41, and a brake on this shaft is provided by a lever 70 engaging it and carrying a weight 71.

It will be seen from the above described apparatus that bulk raw rubber material placed in the hopper 11 will be discharged in tubular form from the annular orifice and will thence be severed longitudinally to make a flat sheet, which will drop on to the horizontal reach of the canvas, and that then the canvas and rubber are fed along at a continuous rate and wound together on the receiving spool. The speed of travel of the feeding rolls 50 is selected with reference to the speed of discharge of the rubber tube, so that the operation may be continuous. Before starting the operation the canvas is threaded from the spool 40 about the rolls 43 and 44 and its ends secured to the barrel of the spool 45. Then it is only necessary to place the raw rubber stock in the hopper 11 and apply the power to the belt 27.

To vary the thickness of the sheet of rubber produced I make the surface of the mandrel 30 slightly conical and I preferably correspondingly taper the surrounding inner surface of the die, and I make the mandrel adjustable longitudinally, so that the radial dimension of the annular space may be varied. For clearness of illustration the amount of taper is exaggerated in Figs. 3 and 5.

To enable the mandrel to be adjusted in and out conveniently, I make its supporting stud 31 rigid with the mandrel and provide it with threads screwing into the stationary sleeve 23. To lock the mandrel in adjusted position I may split the inner end of the stud and provide such split portion with a conical bore in which seats a cone 37 on a rod 38 which extends axially through the stud and mandrel hub 34 and has a nut 39 on its outer end. The tightening of this nut will draw the rod and spring the split inner end of the stud into binding engagement with the thread in the bearing sleeve.

Figs. 7, 8 and 9 show an embodiment of the apparatus adapted for making two flat sheets of rubber simultaneously from the tubular rubber discharged by the tubing machine. As shown in these views the tubing machine proper is the same as already described; instead however of a single knife carried at the top of the discharge orifice I provide two knives 80 at diametric opposite sides carried by the die 18. These knives sever the discharged rubber tubing into two longitudinal sections. The lower section passes onto the fabric strip "D" which has a course similar to the strip "C" heretofore described and passes from a supply spool 40 over the roller 43, thence between the wide roll 44 and the narrow rollers 50 onto the receiving spool 45. The upper rubber section "S¹" is received by the reach "E¹" of an additional fabric strip, "E". This strip is shown as passing from a supply roll 90 around a guide roller 91 thence around a guide roller 92 near the orifice thence over a roller 93, its edges being engaged by narrow rolls 94 and thence to a receiving roll 95. 96 indicates a brake on the supply roll 90. The rolls 94 and 95 are driven similarly to the rolls 50 and 45 as already described. In the embodiment shown, this is effected by a belt 97 passing from a pulley on the far end of the shaft of the roller 50 to one of the pulleys 98, Fig. 8, on the shaft of the rolls 94. A belt 99 from the other one of these pulleys 98 passes to a pulley on the far end of the shaft of the spool 95.

It will be seen that in the embodiment last described, each half of the product of the tubing machine is wound up as a flat sheet with interposed fabric in a manner similar to that in which the single sheet was taken care of in Figs. 1 to 3.

It will be seen that by my invention the inexpensive tubing machine or pug-mill may be employed as the means for converting the bulk raw rubber into thin sheets, the rest of the apparatus serving to sever the product as desired and take care of it for future use. The operation can be rapidly and economically carried out, and by means of the adjustment of the dies may be availed of to produce rubber of various thicknesses as desired. An apparatus of the multiple character shown in Fig. 7 may be availed of for making a single sheet by simply taking off the two knives 80 and placing a single knife at the top of the die and removing the driving belt 97. If desired an apparatus similar to Fig. 7 might be adapted for making more than two strips by employing more than two knives and increasing the number of fabrics accordingly.

I claim:

1. The process of making sheet rubber comprising forcing rubber stock by pressure through a restricted passageway and allowing the resulting product to flatten into a sheet or sheets, supporting the sheet or sheets and winding up the product with suitable intermediate separation.

2. The method of making sheet rubber comprising discharging the same through an annular die in tubular form, slitting the tube to make a flat sheet or sheets, supporting the sheet or sheets on a movable support and winding up each flat sheet into a roll with an intervening separating element.

3. The method of making sheet rubber consisting of discharging the rubber in a tubular form through a tubing machine, slitting the tube to make the rubber into one or more flat sheets, supporting each flat sheet by fabric strip, and simultaneously winding the fabric strip and rubber sheet onto a spool.

4. The combination of a tubing machine, a fabric strip, means for causing material discharged by the tubing machine to take the form of an incomplete tube separated longitudinally which may thus pass as a flat sheet on to the fabric strip and means for winding said fabric strip and sheet rubber together.

5. The combination of a tubing machine and a conveyor strip, means for causing material discharged by the tubing machine to take the form of an incomplete tube, which may thus pass as a flat sheet on to the conveyor strip, means for feeding said strip and sheet rubber together, a spool to receive the strip and rubber in alternate layers, and means for rotating the spool.

6. The combination of a tubing machine, a fabric strip, means for causing the material discharged by the tubing machine to take the form of an incomplete tube separated longitudinally, all or part of which may thus drop as a flat sheet on to the fabric strip and sheet rubber together, a spool to receive the fabric and rubber in alternate layers, and means for positively feeding the fabric and rubber at definite speed irrespective of the increasing diameter of the spool.

7. The combination with a tubing machine of means for severing the discharged material to make an incomplete tube separated longitudinally, a strip of separating material having a substantially horizontal portion in front of and below the discharged rubber, and spools from and onto which said strip is fed.

8. The combination with a tubing machine of means for severing the discharged material longitudinally to make an incomplete tube, a conveyor strip having a substantially horizontal portion in front of and below the discharged rubber, spools from and onto which said strip is fed, said strip being wider than the width of the rubber sheet produced, and feeding means engaging the marginal portions of the strip beyond the rubber sheet.

9. In a device of the class described, a casing having a discharge orifice, an extruding screw in said casing, a member adjacent said discharge orifice and forming a bearing for the shaft of said screw, and a mandrel adjustably secured to said member and adapted to be moved longitudinally of the orifice and cooperating therewith to form the material extruded by said screw into a tubular form and a severing means for slitting said tube longitudinally.

10. The combination of a tubing machine having a casing with a removable tubular die, a mandrel within the die, means within the casing for forcing the material toward the space between the die and mandrel, a plurality of knives carried adjacent to the discharge end of said space and adapted to slit said tube into a plurality of strips, and a plurality of receiving belts in front of the mandrel corresponding in number to the strips formed and adapted to convey said strips from the mandrel.

11. The combination of a tubing machine having a casing with an orifice, a mandrel within the orifice, means within the casing for forcing the material toward the orifice, two knives carried adjacent to the orifice for slitting the tube into two strips and upper and lower horizontally arranged receiving belts in front of the mandrel adapted to receive the strips respectively.

12. The combination of a tubing machine having a casing with a discharge orifice, a mandrel within said orifice, the casing and mandrel having cooperative surfaces separated from each other, one of such surfaces being conical, means for adjusting the mandrel longitudinally to the casing, a knife for causing the material discharged to take the form of an incomplete tube, and a receiving belt below and in front of the mandrel and means for winding said belt and tube together.

In testimony whereof, I hereunto affix my signature.

FRED THOMAS ROBERTS.